US009897795B2

United States Patent
Chou et al.

(10) Patent No.: US 9,897,795 B2
(45) Date of Patent: Feb. 20, 2018

(54) COLOR WHEEL DEVICE

(71) Applicant: DELTA ELECTRONICS, INC., Taoyuan (TW)

(72) Inventors: Yen-I Chou, Taoyuan (TW); Chi Chen, Taoyuan (TW); Kai-Shiang Yang, Taoyuan (TW); Shih-Kuo Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 128 days.

(21) Appl. No.: 14/804,699

(22) Filed: Jul. 21, 2015

(65) Prior Publication Data
US 2016/0161736 A1 Jun. 9, 2016

Related U.S. Application Data

(60) Provisional application No. 62/088,930, filed on Dec. 8, 2014.

(30) Foreign Application Priority Data

Apr. 30, 2015 (TW) .............................. 104113872 A

(51) Int. Cl.
*G02B 26/00* (2006.01)
*F21V 9/00* (2015.01)
(Continued)

(52) U.S. Cl.
CPC ........... *G02B 26/008* (2013.01); *G03B 21/16* (2013.01); *G03B 21/204* (2013.01);
(Continued)

(58) Field of Classification Search
CPC .... G02B 26/007; G02B 26/008; G02B 21/16; G02B 21/204; H04N 9/3114;
(Continued)

(56) References Cited

U.S. PATENT DOCUMENTS 6,755,554 B2 * 6/2004 Ohmae ................. F21S 10/007
348/743
8,342,692 B2 1/2013 Hirosawa et al.
(Continued)

FOREIGN PATENT DOCUMENTS

CN 202025182 11/2011
CN 102853377 1/2013
(Continued)

OTHER PUBLICATIONS

CN203646734, Hong et al, Jun. 2014, English Translation.*
TW200907546, Ho, Feb. 2007, English Translation.*

*Primary Examiner* — Peggy Neils
(74) *Attorney, Agent, or Firm* — Hauptman Ham, LLP

(57) ABSTRACT

A color wheel device is used in a projector. The color wheel device includes a housing, a color wheel, a motor, and a thermally conductive member. The housing has at least one through hole for a light beam to pass through. The color wheel is disposed in the housing and includes a substrate and a phosphor layer. The substrate has a light-receiving surface. The phosphor layer is disposed on the light-receiving surface. The light beam forms a light spot on the phosphor layer. The motor is disposed in the housing for driving the substrate to rotate. During the rotation of the substrate, the light spot forms a circular path on the phosphor layer. The thermally conductive member is disposed on the housing substantially at a location to which the circular path maps.

11 Claims, 8 Drawing Sheets

(51) Int. Cl.
*G03B 21/20* (2006.01)
*G03B 21/16* (2006.01)
*H04N 9/31* (2006.01)

(52) U.S. Cl.
CPC ......... *H04N 9/3114* (2013.01); *H04N 9/3144* (2013.01); *H04N 9/3158* (2013.01); *H04N 9/3161* (2013.01)

(58) Field of Classification Search
CPC .. H04N 9/3144; H04N 9/3158; H04N 9/3161; F21S 10/007; F21V 9/08
See application file for complete search history.

(56) References Cited

U.S. PATENT DOCUMENTS

| | | | | |
|---|---|---|---|---|
| 8,425,052 | B2 * | 4/2013 | Peeters | G02B 26/008 |
| | | | | 353/30 |
| 8,678,597 | B2 * | 3/2014 | Nishimura | G03B 21/16 |
| | | | | 353/119 |
| 9,115,872 | B2 * | 8/2015 | Cheng | F21S 10/02 |
| 9,152,021 | B2 * | 10/2015 | Li | F21S 48/1131 |
| 9,442,351 | B2 * | 9/2016 | Lin | G03B 21/16 |
| 9,482,860 | B2 * | 11/2016 | Takamatsu | G02B 19/0023 |
| 2002/0003704 | A1 | 1/2002 | Ohmae et al. | |
| 2006/0007408 | A1 | 1/2006 | Kim | |
| 2007/0170379 | A1 * | 7/2007 | Watson | G02B 5/22 |
| | | | | 250/515.1 |
| 2012/0013854 | A1 * | 1/2012 | Nishimura | G03B 21/16 |
| | | | | 353/57 |
| 2013/0169938 | A1 | 7/2013 | Huang et al. | |
| 2016/0077326 | A1 * | 3/2016 | Yamagishi | G02B 26/008 |
| | | | | 353/61 |

FOREIGN PATENT DOCUMENTS

| | | | | |
|---|---|---|---|---|
| CN | 103885274 | | 6/2014 | |
| CN | 203643734 | * | 6/2014 | ............ G03B 21/16 |
| JP | 2009-134201 | | 6/2009 | |
| JP | 2011-505858 | | 2/2011 | |
| JP | 2014-146056 A | | 8/2014 | |
| TW | 20070129547 | * | 8/2007 | ............ G03B 21/16 |
| TW | I432878 | | 4/2014 | |
| TW | M482763 | | 7/2014 | |

* cited by examiner

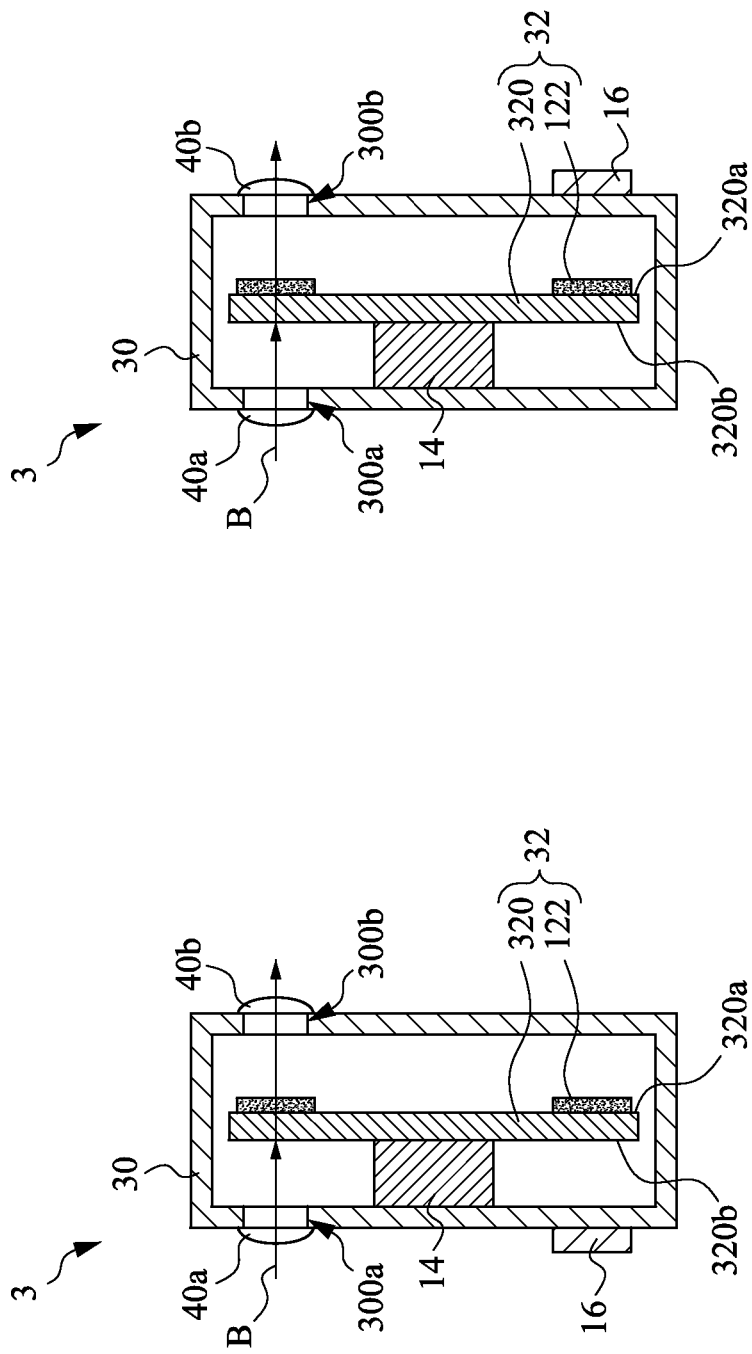

COLOR WHEEL DEVICE

RELATED APPLICATIONS

This application claims priority to U.S. Provisional Patent Application Ser. No. 62/088,930 filed Dec. 8, 2014, and Taiwan Application Serial Number 104113872, filed Apr. 30, 2015, which are herein incorporated by reference.

BACKGROUND

Technical Field

The present disclosure relates to a color wheel device, and more particularly, to the color wheel device used in a projector.

Description of Related Art

Since the invention of projectors, projectors have been applied to various fields with the development of science and technology. From consumer products to high-tech products, the applications of the projectors have been extended. For example, a projection system is applied to enlarge projecting objects in a large conference, or a projection screen or TV is used for commercial purposes, so as to show real-time images for the contents of presentations.

A common architecture of a projector can be divided into a light source module and an optical processing unit. In general, the light emitted by a light source of the light source module is collected by optical components and filtered by a filter and a color wheel, and the processed light is then projected to a projection screen by the optical processing unit. As projectors develop, the light source module can use a laser light source with a color wheel coated with fluorescent powder, so as to provide light having different wavelengths.

However, the energy of a laser beam is more concentrated. When the color wheel receives the laser beam, the light spot of the laser beam projected on the color wheel has a very large energy density and generates an extremely high temperature, which may damage the fluorescent powder or decrease the luminous efficiency. With the increasing requirements for the brightness of projectors, the energies of the used laser beams also increase, so that the problems of damaging the fluorescent powder or decreasing the luminous efficiency will become increasingly evident.

SUMMARY

An aspect of the disclosure is to provide a color wheel device to solve the foregoing problems.

To achieve the foregoing purpose, according to an embodiment of the disclosure, a color wheel device includes a housing, a color wheel, a motor, and a thermally conductive member. The housing has at least one through hole for a light beam to pass through. The color wheel is disposed in the housing and includes a substrate and a phosphor layer. The substrate has a light-receiving surface. The phosphor layer is disposed on the light-receiving surface. The light beam forms a light spot on the phosphor layer. The motor is disposed in the housing for driving the substrate to rotate. During the rotation of the substrate, the light spot forms a circular path on the phosphor layer. The thermally conductive member is disposed on the housing substantially at a location to which the circular path maps.

In an embodiment of the disclosure, the thermally conductive member is located at a side of the substrate adjacent to the light-receiving surface and disposed on the outside of the housing.

In an embodiment of the disclosure, the thermally conductive member is located at a side of the substrate adjacent to the light-receiving surface and disposed in the housing.

In an embodiment of the disclosure, the substrate further has a back light surface. The light-receiving surface and the back light surface are respectively located at two opposite sides of the substrate.

In an embodiment of the disclosure, the thermally conductive member is located at a side of the substrate adjacent to the back light surface and disposed on the outside of the housing.

In an embodiment of the disclosure, the thermally conductive member is located at a side of the substrate adjacent to the back light surface and disposed in the housing.

In an embodiment of the disclosure, the substrate is a transmissive substrate. The number of the at least one through hole is at least two or a multiple of two, and the through holes are aligned with each other across the substrate in an optical path of the light beam.

In an embodiment of the disclosure, an orthogonal projection of the thermally conductive member on the light-receiving surface at least partially overlaps the circular path.

In an embodiment of the disclosure, the orthogonal projection of the thermally conductive member on the light-receiving surface at least overlaps half of the circular path.

In an embodiment of the disclosure, during the rotation of the substrate, an orthogonal projection of the through hole on the light-receiving surface forms a circular projection band on the light-receiving surface. An orthogonal projection of the thermally conductive member on the light-receiving surface at least partially overlaps the circular projection band.

In an embodiment of the disclosure, the substrate is a reflective substrate.

In an embodiment of the disclosure, the thermally conductive member is a heat pipe or a cooling fluid pipeline.

According to another embodiment of the disclosure, a color wheel device includes a housing, a color wheel, a motor, and a thermally conductive member. The housing has at least one through hole for a light beam to pass through. The color wheel is disposed in the housing and includes a substrate and a phosphor layer. The substrate has a light-receiving surface. The phosphor layer is disposed on the light-receiving surface. The motor is disposed in the housing for driving the substrate to rotate. During the rotation of the substrate, the light beam radiates a circular irradiated zone on the phosphor layer, so as to form a circular hot zone corresponding to the circular irradiated zone on the housing. The circular hot zone is substantially located at a linear position at which the light beam projects. The thermally conductive member is disposed on the housing substantially at a location corresponding to the circular hot zone.

In an embodiment of the disclosure, the area of the circular hot zone is slightly larger than the area of the circular irradiated zone.

Accordingly, the thermally conductive member of the color wheel device of the disclosure disposes is disposed on the housing at a location, and a zone of the phosphor layer directly radiated by the light beam (substantially corresponding to a zone formed on the phosphor layer by the light spot of the light beam during the rotation of the substrate) substantially maps to the location. Hence, large amounts of heat generated by the light beam at the light spot on the phosphor layer can be quickly transmitted away via the substrate and the housing and then dissipated by the thermally conductive member. As a result, the color wheel device of the disclosure can prevent large amounts of heat from accumulating at the zone of the phosphor layer directly radiated by the light beam, so as to increase the tolerability of the phosphor layer and indirectly improve the luminous efficiency of the phosphor layer.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 7A is a cross-sectional view of a color wheel device according to an embodiment of the disclosure;

FIG. 7B is a cross-sectional view of the color wheel device in FIG. 7A according to another embodiment of the disclosure;

DETAILED DESCRIPTION

Figure 1:
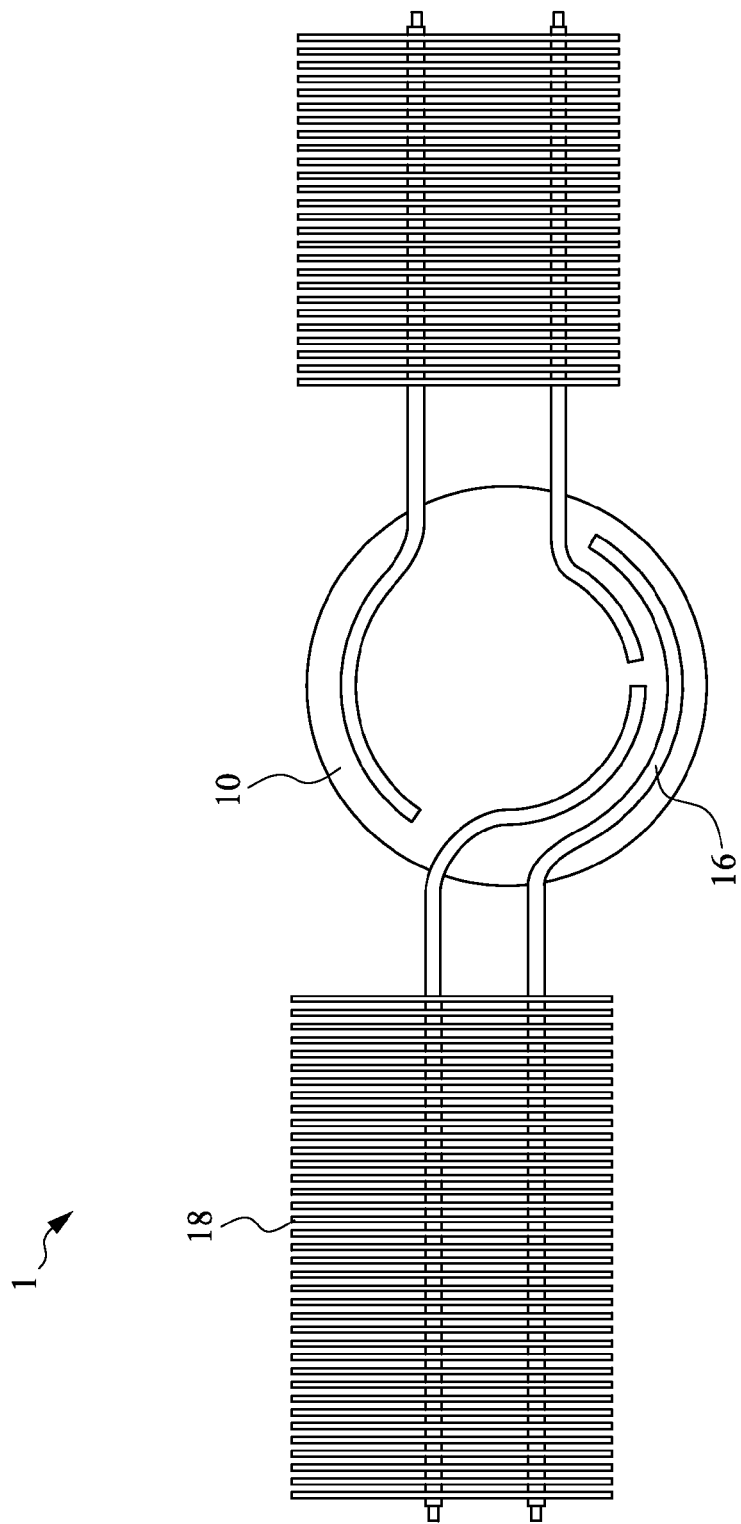
FIG. 1 is a rear view of a color wheel device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
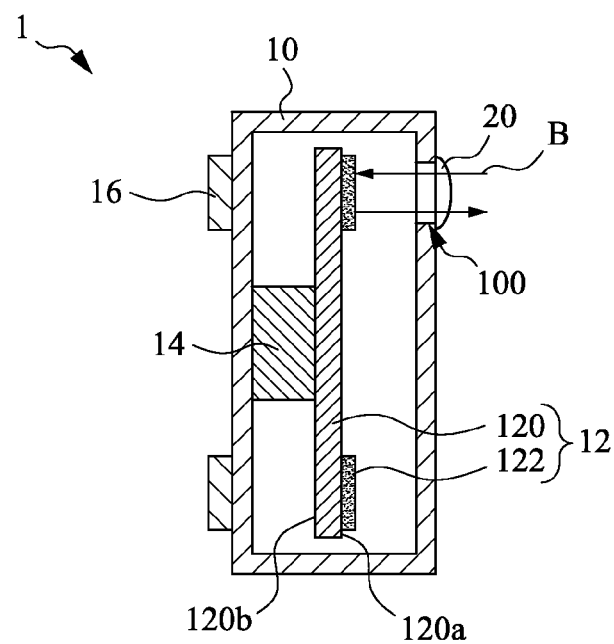
FIG. 2 is a cross-sectional view of the color wheel device according to an embodiment of the disclosure.
Figure 3:
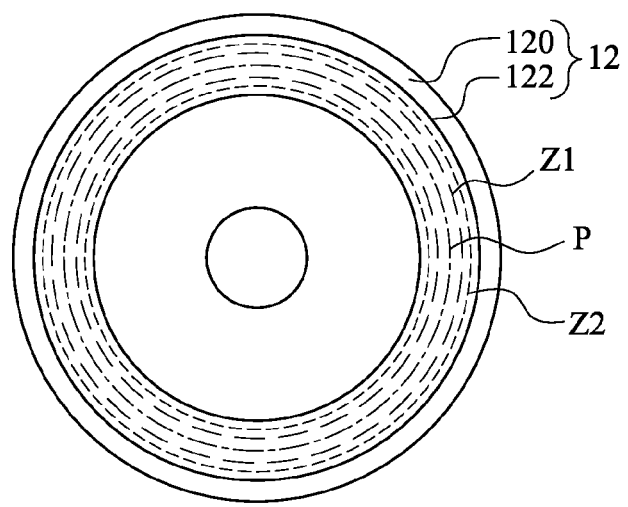
FIG. 3 is a front view of a color wheel in FIG. 2.

FIG. 1 is a rear view of a color wheel device 1 according to an embodiment of the disclosure. FIG. 2 is a cross-sectional view of a color wheel device 1 according to an embodiment of the disclosure. FIG. 3 is a front view of a color wheel 12 in FIG. 2.

As shown in FIG. 1 to FIG. 3, in the embodiment, the color wheel device can be used in a projector (not shown). The color wheel device 1 includes a housing 10, a color wheel 12, a motor 14, a thermally conductive member 16, a plurality of heat-dissipating fins 18, and a lens 20. The housing 10 has a through hole 100 for a light beam B (e.g., a laser beam) to pass through. The lens 20 is disposed at the through hole 100. The color wheel 12 is disposed in the housing 10 and includes a substrate 120 and a phosphor layer 122. The substrate 120 has a light-receiving surface 120a and a back light surface 120b. The light-receiving surface 120a and the back light surface 120b are respectively located at two opposite sides (as illustrated by the right side and the left side of the substrate 120 in FIG. 2) of the substrate 120. The phosphor layer 122 is disposed on the light-receiving surface 120a. The motor 14 is disposed in the housing 10 for driving the substrate 120 to rotate. The heat-dissipating fins 18 are thermally connected to the thermally conductive member 16.

For example, in some embodiments, the above-mentioned projector is a general DLP (Digital Light Processing), and the basic architecture of the DLP includes DMDs (Digital Micromirror Devices) accompanied with the color wheel device 1. When the light beam B emitted by a light source (not shown) passes through the through hole 100 and reaches the phosphor layer 122 of the color wheel 12, the light beam B will be mixed into colored lights owing to reaching different color zones on the color wheel 12 (the emitted color zone changes because the color wheel 12 is driven by the motor 14). The colored lights are mostly red light, green light, and blue light. The colored lights are then reflected to a screen by the DMDs to form a planar image. As shown in FIG. 2, in the embodiment, the substrate 120 of the color wheel 12 is a reflective substrate. That is, the color wheel device of the embodiment is a reflective color wheel device. After the light beam B passes through the through hole 100 and reaches the phosphor layer 122, the mixed colored lights will be reflected by the substrate 120 and then emit out of the housing 10 via the through hole 100.

Figure 5A:
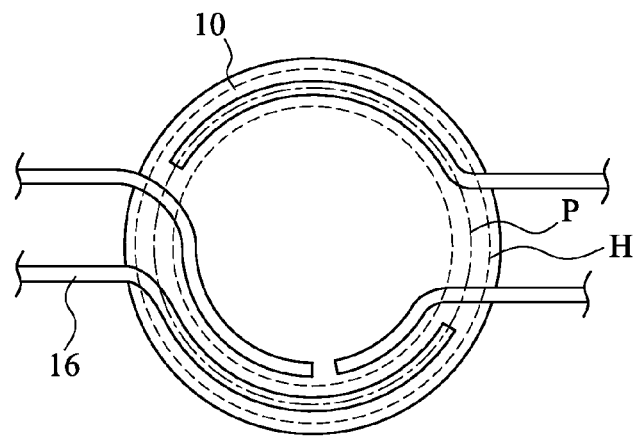
FIG. 5A is a schematic diagram illustrating the thermally conductive member in FIG. 1.

The zone on the phosphor layer 122 of the rotating color wheel 12 radiated by the light beam B is defined as a circular irradiated zone Z1 (as illustrated by two inner circular dashed lines in FIG. 3). As confirmed by experiments, after radiated by the light beam B for a long time, the circular irradiated zone Z1 on the phosphor layer 122 will be heated to accumulate large amounts of heat. The heat is transmitted to the housing 10 in form of heat radiation or heat convection, so as to form a circular hot zone H (as shown in FIG. 5A) on the housing 10 corresponding to the circular irradiated zone Z1. It should be pointed out that because the heat accumulated at the circular irradiated zone Z1 is transmitted to the housing 10 in form of heat radiation or heat convection, the circular hot zone H on the housing 10 is substantially located at a linear position at which the light beam B projects, and the area of the circular hot zone H will be slightly larger than the area of the circular irradiated zone Z1 due to the heat conduction phenomena on the housing 10.

In order to dissipate away the heat generated at the color wheel 12, the thermally conductive member 16 is disposed on the outside of the housing 10 substantially on a location of the housing 10 corresponding to the circular irradiated zone Z1 in the embodiment. That is, the thermally conductive member 16 is disposed on a location of the housing 10 corresponding to the circular hot zone H. Hence, large amounts of heat generated at the circular irradiated zone Z1 on the phosphor layer 122 can be quickly transmitted away via the substrate 120 and the circular hot zone H on the housing 10 and then dissipated to the heat-dissipating fins 18 by the thermally conductive member 16, and the large area of the heat-dissipating fins 18 can perform the heat exchange with the air so as to dissipate the heat to the air. As a result, the color wheel device 1 of the embodiment can prevent large amounts of heat from accumulating at the circular irradiated zone Z1 on the phosphor layer 122, so as to increase the tolerability of the phosphor layer 122 and indirectly improve the luminous efficiency of the phosphor layer 122.

On the other hand, the light beam B forms a light spot on the phosphor layer 122. During the rotation of the substrate 120, the light spot forms a circular path P (as illustrated by the centerline in FIG. 3) on the phosphor layer 122. In the embodiment, the thermally conductive member 16 is disposed on the housing 10 substantially at a location to which the circular path P maps (as shown in FIG. 5A). Specifically, an orthogonal projection of the thermally conductive member 16 on the light-receiving surface 120a of the substrate 120 at least partially overlaps the circular path P (referring to FIG. 5A). Based on the circular path P defined above, the thermally conductive member 16 can be disposed at a definite location on the housing 10 (because the location of the foregoing circular hot zone H substantially corresponds to the location of the circular path P), so as to surely achieve the purpose of quickly transmitting the large amounts of heat on the color wheel 12 away. In order to achieve a better thermal conduction effect, in some embodiments, the orthogonal projection of the thermally conductive member 16 on the light-receiving surface 120a of the substrate 120 at least overlaps half of the circular path P.

Still, on the other hand, during the rotation of the substrate 120, an orthogonal projection of the through hole 100 of the housing 10 on the light-receiving surface 120a of the substrate 120 forms a circular projection band Z2 on the light-receiving surface 120a (as illustrated by two outer circular dashed lines in FIG. 3). An orthogonal projection of the thermally conductive member 16 on the light-receiving surface 120a of the substrate 120 at least partially overlaps the circular projection band Z2. Based on the circular projection band Z2 defined above, the thermally conductive member 16 can similarly be disposed at a definite location on the housing 10 (because the location of the foregoing circular irradiated zone Z1 substantially corresponds to the location of the circular projection band Z2), so as to surely achieve the purpose of quickly transmitting the large amounts of heat on the color wheel 12 away. In the embodiment, as shown in FIG. 3, the area of the circular irradiated zone Z1 is slightly smaller than the area of the circular projection band Z2, but the disclosure is not limited in this regard. In practical applications, the area of the circular irradiated zone Z1 can be equal to the area of the circular projection band Z2.

Figure 4C:
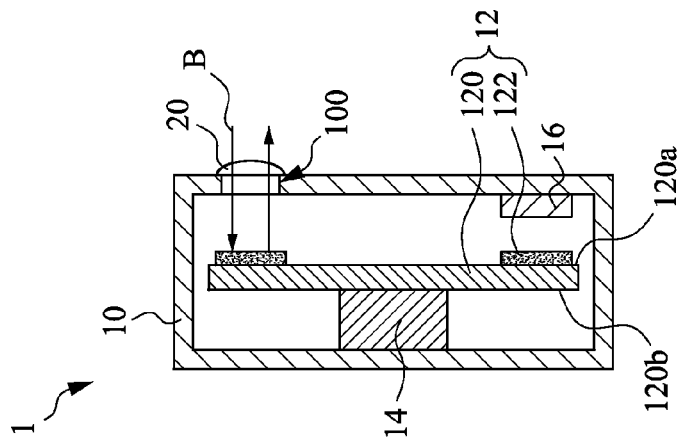
FIG. 4C is a cross-sectional view of the color wheel device in FIG. 2 according to another embodiment of the disclosure.
Figure 4B:
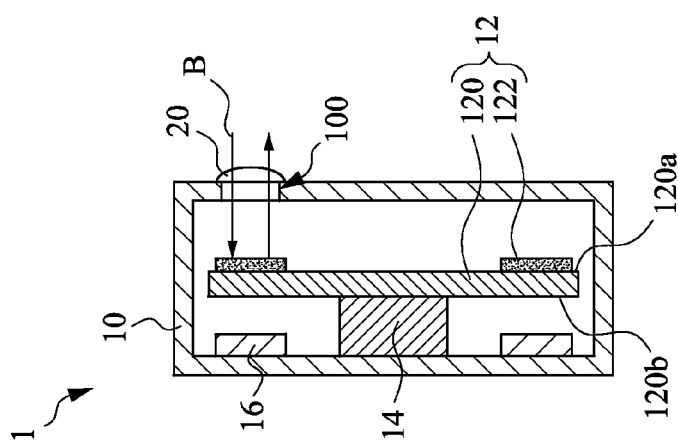
FIG. 4B is a cross-sectional view of the color wheel device in FIG. 2 according to another embodiment of the disclosure.
Figure 4A:
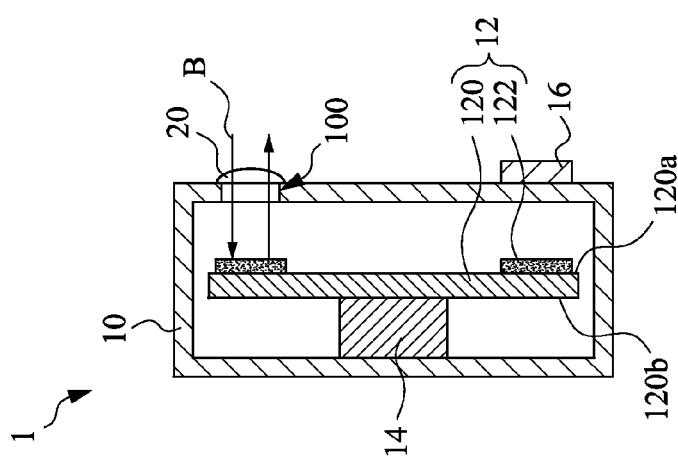
FIG. 4A is a cross-sectional view of the color wheel device in FIG. 2 according to another embodiment of the disclosure.

As shown in FIG. 2, in the embodiment, the thermally conductive member 16 is located at a side of the substrate 120 adjacent to the back light surface 120b and disposed on the outside of the housing 10. However, the disclosure is not limited in this regard. Referring to FIG. 4A to FIG. 4C. FIG. 4A is a cross-sectional view of the color wheel device 1 in FIG. 2 according to another embodiment of the disclosure. FIG. 4B is a cross-sectional view of the color wheel device 1 in FIG. 2 according to another embodiment of the disclo-sure. FIG. 4C is a cross-sectional view of the color wheel device 1 in FIG. 2 according to another embodiment of the disclosure.

As shown in FIG. 4A, the thermally conductive member 16 is located at a side of the substrate 120 adjacent to the light-receiving surface 120a and disposed on the outside of the housing 10. As shown in FIG. 4B, the thermally conductive member 16 is located at a side of the substrate 120 adjacent to the back light surface 120b and disposed in the housing 10. As shown in FIG. 4C, the thermally conductive member 16 is located at a side of the substrate 120 adjacent to the light-receiving surface 120a and disposed in the housing 10. In the embodiments of FIG. 2 and FIG. 4A, the thermally conductive member 16 is disposed on the outside of the housing 10, so an end of the thermally conductive member 16 can be directly extended and connected to the heat-dissipating fins 18. In the embodiments of FIG. 4B and FIG. 4C, the thermally conductive member 16 is disposed in the housing 10, so an end of the thermally conductive member 16 must pass through the housing 10 to be extended and connected to the heat-dissipating fins 18. In addition, in the embodiment of FIG. 4A, the thermally conductive member 16 disposed on the housing 10 must bypass the lens 20.

In the above embodiments, although the thermally conductive member 16 may be disposed at different locations on the housing 10, the purpose of quickly transmitting the large amounts of heat on the color wheel 12 away can be achieved only if the principle of disposing the thermally conductive member 16 on the housing 10 along the circular path P defined above (i.e., making the orthogonal projection of the thermally conductive member 16 on the light-receiving surface 120a overlap the circular path P, the circular irradiated zone Z1, the circular projection band Z2, or the circular hot zone H as possible). In some embodiments, a person skilled in the art can use more than two light beams B to radiate into the housing 10 to the color wheel 12 respectively via more than two through holes 100 according practical requirements, and the heat can be effectively removed by using the foregoing principle.

Figure 5B:
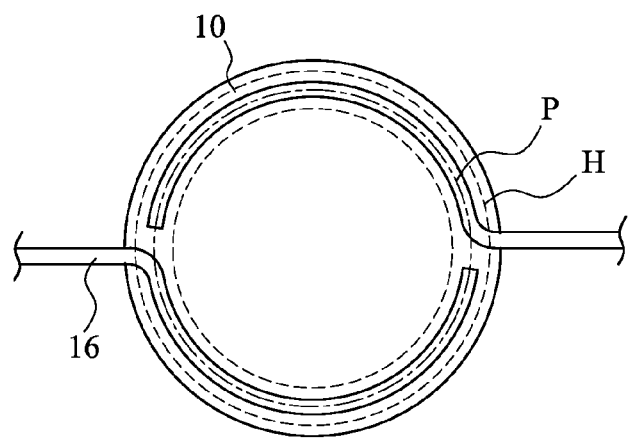
FIG. 5B is a schematic diagram illustrating the thermally conductive member in FIG. 1 according to another embodiment of the disclosure.
Figure 5C:
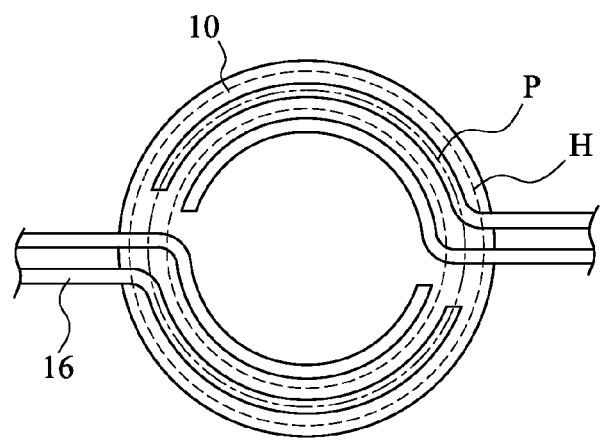
FIG. 5C is a schematic diagram illustrating the thermally conductive member in FIG. 1 according to another embodiment of the disclosure.

FIG. 5A is a schematic diagram illustrating the thermally conductive member 16 in FIG. 1. In the embodiment, the color wheel device 1 includes four thermally conductive members 16, in which the outer two thermally conductive members 16 overlap the circular path P and the circular hot zone H, and the inner two thermally conductive members 16 are substantially disposed along the inner edge of the circular hot zone H. Although the inner two thermally conductive members 16 do not overlap the circular path P and the circular hot zone H, the inner two thermally conductive members 16 can achieve the effect of auxiliary cooling. However, the disclosure is not limited in this regard. Referring to FIG. 5B and FIG. 5C. FIG. 5B is a schematic diagram illustrating the thermally conductive member 16 in FIG. 1 according to another embodiment of the disclosure. FIG. 5C is a schematic diagram illustrating the thermally conductive member 16 in FIG. 1 according to another embodiment of the disclosure.

As shown in FIG. 5B, in the embodiment, the color wheel device 1 also includes four thermally conductive members 16, in which the outer two thermally conductive members 16 overlap the circular path P and the circular hot zone H, and the inner two thermally conductive members 16 are substantially disposed along the inner edge of the circular hot zone H. It should be pointed out that compared with the embodiment in FIG. 5A, the ration that the orthogonal projection of the thermally conductive member 16 on the light-receiving surface 120a overlaps the circular path P and the circular hot zone H in the present embodiment is more, so the total heat conduction amount can be increased.

To simply achieve the purpose of quickly transmitting the large amounts of heat on the color wheel 12 away, the color wheel device 1 can only include two thermally conductive members 16, as shown in FIG. 5C. In the embodiment, the orthogonal projection of each of the thermally conductive members 16 on the light-receiving surface 120a overlaps about half of the circular path P. Moreover, in some embodiments, the color wheel device can only include a single thermally conductive member 16, and the orthogonal projection of the thermally conductive member 16 on the light-receiving surface 120a overlaps more than half of the circular path P.

In some embodiments, thermally conductive member 16 is a heat pipe or a cooling fluid pipeline, but the disclosure is not limited in this regard. In some embodiments, the thermally conductive member 16 can be attached to or embedded in the housing 10, but the disclosure is not limited in this regard.

Figure 6:
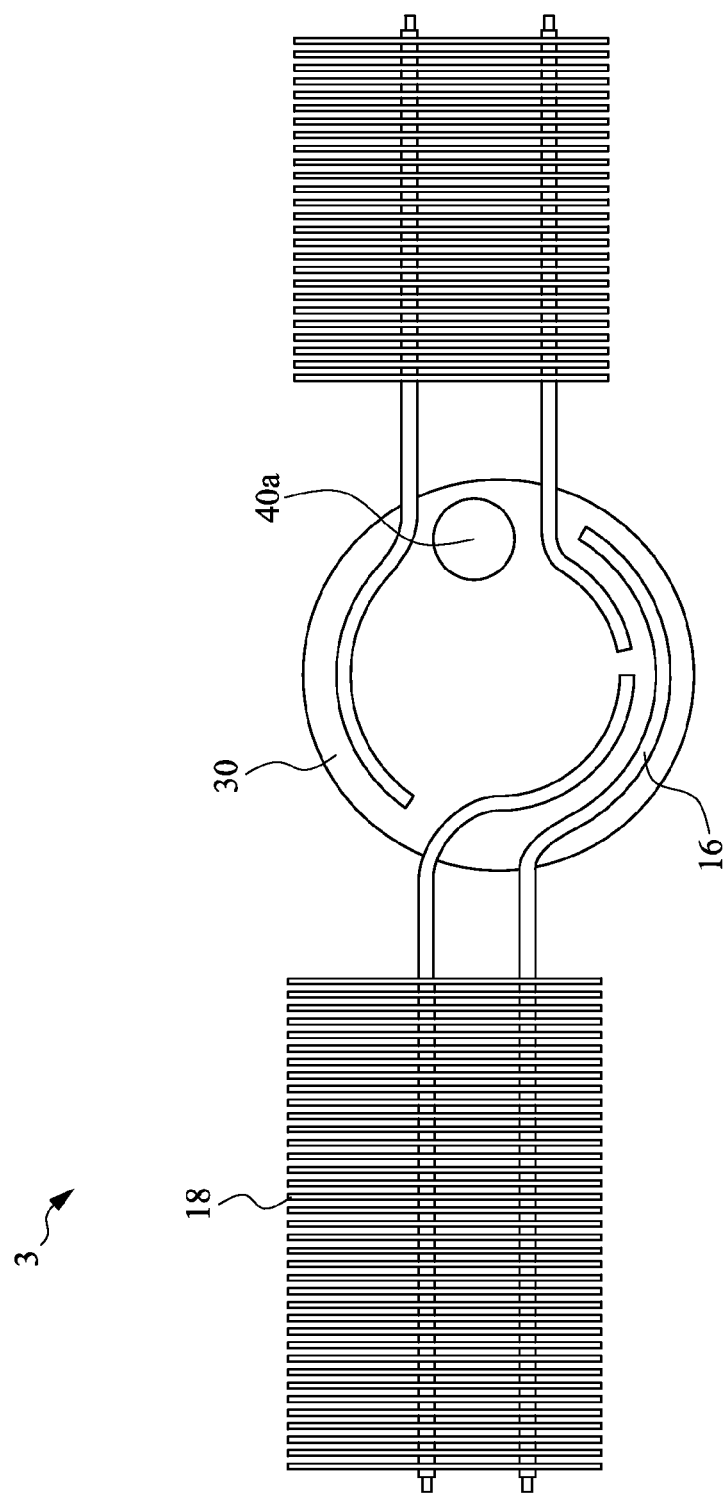
FIG. 6 is a front view of a color wheel device according to an embodiment of the disclosure.

FIG. 6 is a front view of a color wheel device 3 according to an embodiment of the disclosure. FIG. 7A is a cross-sectional view of a color wheel device 3 according to an embodiment of the disclosure.

As shown in FIG. 6 and FIG. 7A, in the embodiment, the color wheel device 3 can also be used in a projector (not shown). The color wheel device 3 includes a housing 30, a color wheel 32, a motor 34, a thermally conductive member 16, a plurality of heat-dissipating fins 38, and two lenses 40a, 40b. The housing 30 has two through holes 300a, 300b for a light beam B (e.g., a laser beam) to pass through. The lenses 40a, 40b are respectively disposed at the through holes 300a, 300b. The color wheel 32 is disposed in the housing 30 and includes a substrate 320 and a phosphor layer 122. The through holes 300a, 300b are aligned with each other across the substrate 320. The substrate 320 has a light-receiving surface 320a and a back light surface 320b. The light-receiving surface 320a and the back light surface 320b are respectively located at two opposite sides (as illustrated by the left side and the right side of the substrate 320 in FIG. 7A) of the substrate 320. The phosphor layer 122 is disposed on the light-receiving surface 320a. The motor 34 is disposed in the housing 30 for driving the substrate 320 to rotate. The heat-dissipating fins 38 are thermally connected to the thermally conductive member 16. In some embodiments using a plurality of light beams B, the through holes can be formed on the housing 30 according to the above principle. For example, four through holes are formed on the housing 30 corresponding to two light beams B. That is, the number of the through holes is a multiple of two.

As shown in FIG. 7A, in the embodiment, the substrate 320 of the color wheel 32 is a transmissive substrate. That is, the color wheel device 3 of the present embodiment is a transmissive color wheel device. After passing through the through hole 300a to reach the substrate 320, the light beam B continuously passes through the substrate 320 to reach the phosphor layer 122 and be mixed into a colored light, and then the colored light leaves the housing 30 via the through hole 300b.

In order to dissipate away the heat generated at the color wheel 32, the thermally conductive member 16 is disposed on the outside of the housing 30 substantially on a location of the housing 30 corresponding to the circular irradiated zone Z1 in the embodiment. That is, the thermally conductive member 16 is disposed on a location of the housing 30 corresponding to the circular hot zone H (referring to FIG. 8A). Hence, large amounts of heat generated at the circular irradiated zone Z1 on the phosphor layer 122 can be quickly transmitted away via the substrate 320 and the circular hot zone H on the housing 30 and then dissipated to the heat-dissipating fins 18 by the thermally conductive member 16. As a result, the color wheel device 3 of the embodiment can also prevent large amounts of heat from accumulating at the circular irradiated zone Z1 on the phosphor layer 122, so as to increase the tolerability of the phosphor layer 122 and indirectly improve the luminous efficiency of the phosphor layer 122.

Figure 8A:
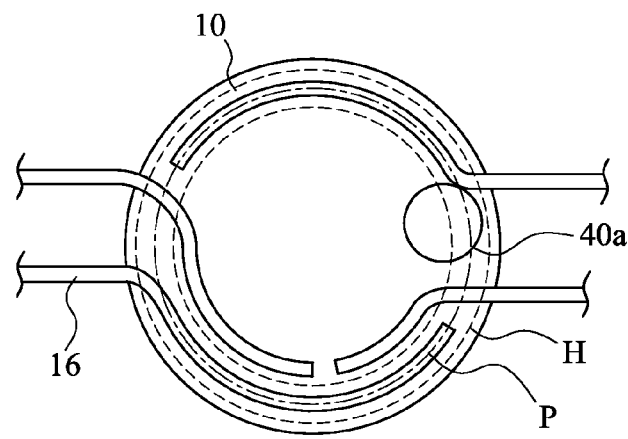
FIG. 8A is a schematic diagram illustrating the thermally conductive member in FIG. 6.

On the other hand, the light beam B forms a light spot on the phosphor layer 122. During the rotation of the substrate 320, the light spot forms a circular path P (referring to the centerline in FIG. 3) on the phosphor layer 122. In the embodiment, the thermally conductive member 16 is disposed on the housing 30 substantially at a location to which the circular path P maps (as shown in FIG. 8A). Specifically, an orthogonal projection of the thermally conductive member 16 on the light-receiving surface 320a of the substrate 320 at least partially overlaps the circular path P (referring to FIG. 8A). Based on the circular path P defined above, the thermally conductive member 16 can be disposed at a definite location on the housing 30 (because the location of the foregoing circular hot zone H substantially corresponds to the location of the circular path P), so as to surely achieve the purpose of quickly transmitting the large amounts of heat on the color wheel 32 away. In order to achieve a better thermal conduction effect, in some embodiments, the orthogonal projection of the thermally conductive member 16 on the light-receiving surface 320a of the substrate 320 at least overlaps half of the circular path P.

Still, on the other hand, during the rotation of the substrate 320, an orthogonal projection of the through hole 300a of the housing 30 on the light-receiving surface 320a of the substrate 320 forms a circular projection band Z2 on the light-receiving surface 320a (referring to two outer circular dashed lines in FIG. 3). An orthogonal projection of the thermally conductive member 16 on the light-receiving surface 320a of the substrate 320 at least partially overlaps the circular projection band Z2. Based on the circular projection band Z2 defined above, the thermally conductive member 16 can similarly be disposed at a definite location on the housing 30 (because the location of the foregoing circular irradiated zone Z1 substantially corresponds to the location of the circular projection band Z2), so as to surely achieve the purpose of quickly transmitting the large amounts of heat on the color wheel 32 away.

Figure 7C:
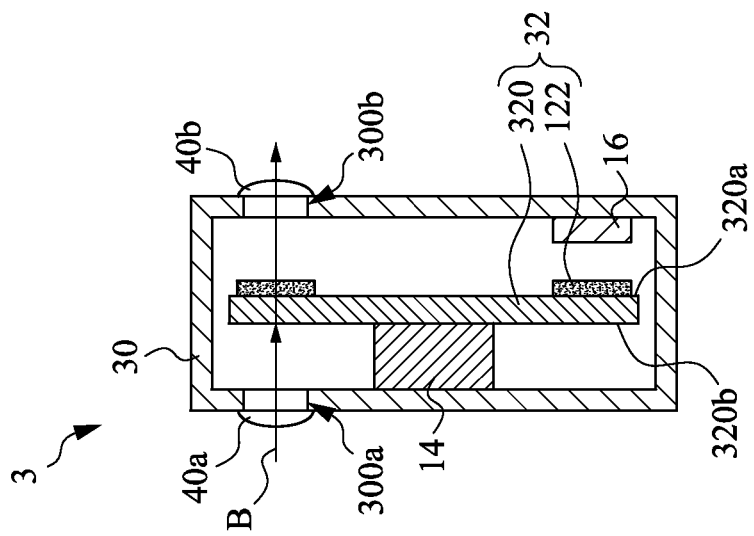
FIG. 7C is a cross-sectional view of the color wheel device in FIG. 7A according to another embodiment of the disclosure.
Figure 7D:
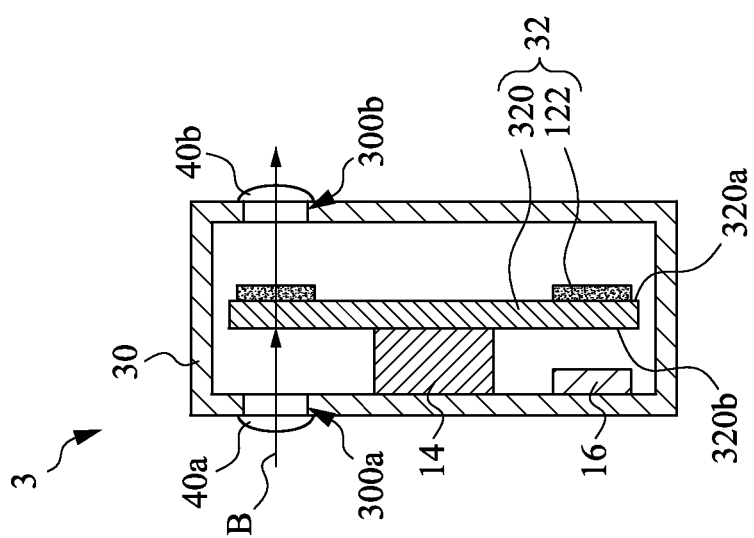
FIG. 7D is a cross-sectional view of the color wheel device in FIG. 7A according to another embodiment of the disclosure.

As shown in FIG. 7A, in the embodiment, the thermally conductive member 16 is located at a side of the substrate 320 adjacent to the back light surface 320b and disposed on the outside of the housing 30. However, the disclosure is not limited in this regard. Referring to FIG. 7B to FIG. 7D. FIG. 7B is a cross-sectional view of the color wheel device 3 in FIG. 7A according to another embodiment of the disclosure. FIG. 7C is a cross-sectional view of the color wheel device 3 in FIG. 7A according to another embodiment of the disclosure. FIG. 7D is a cross-sectional view of the color wheel device 3 in FIG. 7A according to another embodiment of the disclosure.

As shown in FIG. 7B, the thermally conductive member 16 is located at a side of the substrate 320 adjacent to the light-receiving surface 320a and disposed on the outside of the housing 30. As shown in FIG. 7C, the thermally conductive member 16 is located at a side of the substrate 320 adjacent to the back light surface 320b and disposed in the housing 30. As shown in FIG. 7D, the thermally conductive member 16 is located at a side of the substrate 320 adjacent to the light-receiving surface 320a and disposed in the housing 30. In the embodiments of FIG. 7A and FIG. 7B, the thermally conductive member 16 is disposed on the outside of the housing 30, so an end of the thermally conductive member 16 can be directly extended and connected to the heat-dissipating fins 18. In the embodiments of FIG. 7C and FIG. 7D, the thermally conductive member 16 is disposed in the housing 30, so an end of the thermally conductive member 16 must pass through the housing 30 to be extended and connected to the heat-dissipating fins 18. In addition, the thermally conductive member 16 disposed on the housing 30 must bypass the lens 40a in the embodiment of FIG. 7A, and the thermally conductive member 16 disposed on the housing 30 must bypass the lens 40b in the embodiment of FIG. 7B.

In the above embodiments, although the thermally conductive member 16 may be disposed at different locations on the housing 30, the purpose of quickly transmitting the large amounts of heat on the color wheel 32 away can be achieved only if the principle of disposing the thermally conductive member 16 on the housing 30 along the circular path P defined above (i.e., making the orthogonal projection of the thermally conductive member 16 on the light-receiving surface 320a overlap the circular path P, the circular irradiated zone Z1, the circular projection band Z2, or the circular hot zone H as possible).

Figure 8B:
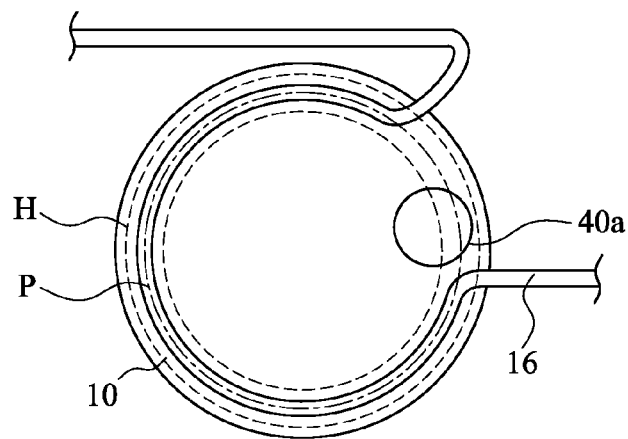
FIG. 8B is a schematic diagram illustrating the thermally conductive member in FIG. 6 according to another embodiment of the disclosure.
Figure 8C:
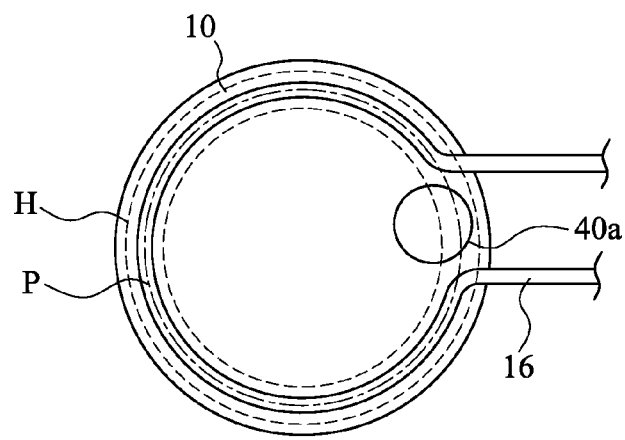
FIG. 8C is a schematic diagram illustrating the thermally conductive member in FIG. 6 according to another embodiment of the disclosure.

FIG. 8A is a schematic diagram illustrating the thermally conductive member 16 in FIG. 6. In the embodiment, the color wheel device 3 includes four thermally conductive members 16, in which the outer two thermally conductive members 16 overlap the circular path P and the circular hot zone H and bypass the lens 40a, and the inner two thermally conductive members 16 are substantially disposed along the inner edge of the circular hot zone H. Although the inner two thermally conductive members 16 do not overlap the circular path P and the circular hot zone H, the inner two thermally conductive members 16 can achieve the effect of auxiliary cooling. However, the disclosure is not limited in this regard. Referring to FIG. 8B and FIG. 8C. FIG. 8B is a schematic diagram illustrating the thermally conductive member 16 in FIG. 6 according to another embodiment of the disclosure. FIG. 8C is a schematic diagram illustrating the thermally conductive member 16 in FIG. 6 according to another embodiment of the disclosure.

As shown in FIG. 8B and FIG. 8C, to simply achieve the purpose of quickly transmitting the large amounts of heat on the color wheel 32 away, the color wheel device 3 can only include a single thermally conductive member 16, and the orthogonal projection of the thermally conductive member 16 on the light-receiving surface 320a overlaps more than half of the circular path P. It should be pointed out that two ends of the thermally conductive member 16 in FIG. 8B extend along opposite directions, and two ends of the thermally conductive member 16 in FIG. 8C extend along the same direction. Hence, if there are enough spaces at two sides of the housing 30 in the projector for installing the heat-dissipating fins 18, the design of the thermally conductive member 16 in FIG. 8B can be used; and if there is only one enough space at one side of the housing 30 in the projector for installing the heat-dissipating fins 18, the design of the thermally conductive member 16 in FIG. 8C can be used.

According to the foregoing recitations of the embodiments of the disclosure, it can be seen that the thermally conductive member of the color wheel device of the disclosure disposes is disposed on the housing at a location, and a zone of the phosphor layer directly radiated by the light beam (substantially corresponding to a zone formed on the phosphor layer by the light spot of the light beam during the rotation of the substrate) substantially maps to the location. Hence, large amounts of heat generated by the light beam at the light spot on the phosphor layer can be quickly transmitted away via the substrate and the housing and then dissipated by the thermally conductive member. As a result, the color wheel device of the disclosure can prevent large amounts of heat from accumulating at the zone of the phosphor layer directly radiated by the light beam, so as to increase the tolerability of the phosphor layer and indirectly improve the luminous efficiency of the phosphor layer.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A color wheel device used in a projector, the color wheel device comprising:
   a housing having at least one through hole for a light beam to pass through;
   a color wheel disposed in the housing and comprising:
      a substrate having a light-receiving surface; and
      a phosphor layer disposed on the light-receiving surface, wherein the light beam forms a light spot on the phosphor layer;
   a motor disposed in the housing for driving the substrate to rotate, wherein during the rotation of the substrate, the light spot forms a circular path on the phosphor layer; and
   a thermally conductive member disposed on an outer surface of the housing substantially along a circular area to which the circular path maps, wherein an orthogonal projection of the thermally conductive member on the light-receiving surface at least overlaps half of the circular path, wherein the thermally conductive member is a heat pipe or a cooling fluid pipeline.

2. The color wheel device of claim 1, wherein the heat pipe or cooling fluid pipeline is located at a side of the substrate adjacent to the light-receiving surface and disposed on the outside of the housing.

3. The color wheel device of claim 1, wherein the heat pipe or cooling fluid pipeline is located at a side of the substrate adjacent to the light-receiving surface and disposed in the housing.

4. The color wheel device of claim 1, wherein the substrate further has a back light surface, and the light-receiving surface and the back light surface are respectively located at two opposite sides of the substrate.

5. The color wheel device of claim 4, wherein the heat pipe or cooling fluid pipeline is located at a side of the substrate adjacent to the back light surface and disposed on the outside of the housing.

6. The color wheel device of claim 4, wherein the thermally conductive member is located at a side of the substrate adjacent to the back light surface and disposed in the housing.

7. The color wheel device of claim 4, wherein the substrate is a transmissive substrate, the number of the at least one through hole is at least two or a multiple of two, and the through holes are aligned with each other across the substrate in an optical path of the light beam.

8. The color wheel device of claim 1, wherein during the rotation of the substrate, an orthogonal projection of the through hole on the light-receiving surface forms a circular projection band on the light-receiving surface, and the orthogonal projection of the heat pipe or cooling fluid pipeline on the light-receiving surface at least partially overlaps the circular projection band.

9. The color wheel device of claim 1, wherein the substrate is a reflective substrate.

10. A color wheel device used in a projector, the color wheel device comprising:
  a housing having at least one through hole for a light beam to pass through;
  a color wheel disposed in the housing and comprising:
    a substrate having a light-receiving surface; and
    a phosphor layer disposed on the light-receiving surface;
  a motor disposed in the housing for driving the substrate to rotate, wherein during the rotation of the substrate, the light beam radiates a circular irradiated zone on the phosphor layer, so as to form a circular hot zone corresponding to the circular irradiated zone on the housing, and the circular hot zone is substantially located at a linear position at which the light beam projects; and
  a thermally conductive member disposed on an outer surface of the housing substantially along the circular hot zone and at least overlapping half of the circular hot zone, wherein the thermally conductive member is a heat pipe or a cooling fluid pipeline.

11. The color wheel device of claim 10, wherein the area of the circular hot zone is slightly larger than the area of the circular irradiated zone.

* * * * *